United States Patent
Yang et al.

(10) Patent No.: US 11,490,267 B2
(45) Date of Patent: Nov. 1, 2022

(54) METHOD AND SYSTEM FOR POLYMORPHIC ALGORITHMS INTERWORKING WITH A NETWORK

(71) Applicant: Verizon Patent and Licensing Inc., Washington, DC (US)

(72) Inventors: Jin Yang, Orinda, CA (US); Krishna K. Bellamkonda, Roanoke, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 350 days.

(21) Appl. No.: 16/790,796

(22) Filed: Feb. 14, 2020

(65) Prior Publication Data

US 2021/0258800 A1 Aug. 19, 2021

(51) Int. Cl.
| | |
|---|---|
| *H04W 16/18* | (2009.01) |
| *H04W 48/18* | (2009.01) |
| *H04W 24/02* | (2009.01) |
| *H04W 24/10* | (2009.01) |
| *H04W 16/22* | (2009.01) |
| *H04W 88/06* | (2009.01) |
| *H04B 7/0413* | (2017.01) |
| *H04L 41/16* | (2022.01) |

(52) U.S. Cl.
CPC .......... *H04W 16/18* (2013.01); *H04W 16/22* (2013.01); *H04W 24/02* (2013.01); *H04W 24/10* (2013.01); *H04W 48/18* (2013.01); *H04W 88/06* (2013.01); *H04B 7/0413* (2013.01); *H04L 41/16* (2013.01)

(58) Field of Classification Search
CPC ..... H04W 16/18; H04W 16/22; H04W 24/02; H04W 24/10; H04W 48/18; H04W 88/06; H04W 52/06; H04B 7/0413; H04B 7/0695; H04L 67/10; H04L 41/16
See application file for complete search history.

(56) References Cited

U.S. PATENT DOCUMENTS

| | | | |
|---|---|---|---|
| 2014/0310709 A1* | 10/2014 | Nirantar | G06F 9/485 718/1 |
| 2018/0183855 A1* | 6/2018 | Sabella | H04W 52/0264 |
| 2019/0245750 A1* | 8/2019 | Banda | H04L 41/0896 |
| 2019/0364492 A1* | 11/2019 | Azizi | H04W 4/029 |
| 2021/0144517 A1* | 5/2021 | Guim Bernat | H04L 41/5054 |

* cited by examiner

*Primary Examiner* — Michael K Phillips (57) ABSTRACT

A method, a device, and a non-transitory storage medium are described in which a polymorphic algorithm service is provided. The service may coordinate and manage the execution of polymorphic algorithms of various optimization types in a multi-tier network, such as a radio access network or a self-organizing network. The service may coordinate the transition of execution of the polymorphic algorithms among the tiers of the multi-tier network, such that the polymorphic algorithm of a type may be active, for any given node, in a single tier of the multi-tier network. The service may monitor the yield of the optimizations based on various machine learning technologies, polices, and optimization targets. The polymorphic algorithms may operate in different time granularities in correspondence to the tiers of the multi-tier network.

20 Claims, 7 Drawing Sheets

METHOD AND SYSTEM FOR POLYMORPHIC ALGORITHMS INTERWORKING WITH A NETWORK

BACKGROUND

Development and design of networks present certain challenges from a network-side perspective and an end device perspective. For example, Centralized Radio Access Network (C-RAN) and Open Radio Access Network (O-RAN) architectures have been proposed to satisfy the increasing complexity, densification, and demands of end device application services of a future generation network.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The development and design of next generation wireless networks may be based on cloud technologies, software defined networking (SDN), and network function virtualization (NFV). Ubiquitous automation, network slicing, machine learning (ML), artificial intelligence (AI), closed loop service assurance, self-healing, self-configuring, and other network attributes and/or services may be integral aspects of the next generation network. The next generation network may include a RAN and a core network, and perhaps other types of networks, such as a service or application layer network, a cloud network, and so forth.

The O-RAN Reference Architecture includes a non-real time RAN Intelligent Controller (MC), a near-real-time MC, various open interfaces (e.g., O1, A1, E2, open fronthaul interface, etc.), interoperability with standard interfaces (e.g., Third Generation Partnership Project (3GPP) interfaces, such as F1, W1, E1, X2, Xn, etc.), open network devices (e.g., O-RAN Centralized Unit (O-CU), O-RAN Distributed Unit (O-DU), O-RAN next generation Node B (O-gNB), O-RAN evolved Node B (O-eNB, etc.), white box hardware, and open source software. The hierarchical RICs may include ML models and/or AI components. The control functionality of the non-real-time RIC relates to a non-real-time timeframe and the control functionality of the near real-time RIC relates to a near real-time timeframe. Messages generated from AI-enabled policies and ML-based models of the non-real-time MC may be communicated to the near-real-time RIC.

Centralized and distributed algorithms that may operate in different time domains, and may relate to different complexities, network nodes, data sets, inputs, and outputs may not have any correlation with each other. Given this framework, another entity may be used to coordinate and harmonize decisions for a given goal, such as optimization or another criterion. However, the harmonization of these types of algorithms having different time granularities and scopes (e.g., type and number of nodes), among other things, towards a common optimization is non-trivial, and can result in high communication latencies due to high transactional velocities between these algorithms for coordination. Further, the configuration of an AI and/or ML framework that manages these algorithms having different goal functions with an aim toward maximizing a yield across the network is problematic.

According to exemplary embodiments, a polymorphic algorithm service is described. According to an exemplary embodiment, a network provides a polymorphic algorithm service based on polymorphic algorithms. The network may include a wireless network, a self-organizing network (SON), an O-RAN-based network, a wired network, a virtual network (e.g., a virtualized RAN (vRAN)), and/or another type of network, for example. According to an exemplary embodiment, the network may include a multi-tier or hierarchical framework. For example, the network may include a three-tiered framework, which may include a centralized tier, an edge tier, and a far edge tier. According to other examples, the network may include a different number of tiers (e.g., two-tiered, four-tiered, etc.) and/or different types of tiers.

According to an exemplary embodiment, the polymorphic algorithms may be directed towards optimizing different metrics pertaining to the network, such as mobility, coverage, quality, capacity, and other metrics, as described herein. According to an exemplary embodiment, the polymorphic algorithms of a metric may have the same goal function across different tiers of the network but may operate according to different time granularities. In this way, the polymorphic algorithm service provides a goal function normalization (e.g., standardize the measure of the algorithm yield) among polymorphic algorithms of the same metric type. The time granularities may be configurable (e.g., non-real-time, near real-time, real-time, and/or other types of time periods). As an example, the time granularity of the polymorphic algorithm of a metric type at node level (e.g., at a third tier of the network) may operate at time granularities in seconds or milliseconds, while the time granularities of the polymorphic algorithm of the metric type across a group of nodes (e.g., at a second tier of the network) may operate at time granularities in seconds or minutes, and the time granularities of the polymorphic algorithm of the metric type across a centralized infrastructure of the network (e.g., at a first tier of the network) may operate at time granularities in hours or days.

According to an exemplary embodiment, the network may include an orchestrator or other type of control device (referred to herein as an orchestrator device) that manages the polymorphic algorithm service. According to an exemplary embodiment, an orchestrator device may manage the execution of the polymorphic algorithms in the network. For example, the orchestrator device may manage the polymorphic algorithms, such as at node level, at a group of nodes level, and at a centralized level of the network.

According to an exemplary embodiment, the orchestrator device may allow the polymorphic algorithms of a metric to operate in a single tier of the network and its associated time granularity, as described herein. For example, for any given node or group of nodes of the network, a polymorphic algorithm of a metric type may be active in only a single tier of the network. For example, multiple instances of the polymorphic algorithm of a metric type may not be active in multiple tiers of the network for a given node or group of nodes. In this regard, for example, in a three-tiered network, the polymorphic algorithm scope for a cell or a cluster of cells or the network may be mutually exclusive such that (Scope(tier 1))∩(Scope (tier 2))∩(Scope (tier 3))==Null. So at a lowest denomination of the network (e.g., at a node level), there may be only one polymorphic algorithm supervising the node from tier 1, tier 2, or tier 3 of the network. According to an exemplary embodiment, the orchestrator device may manage the transition of the polymorphic algorithms of the metric type to operate in another tier and associated time granularity.

According to an exemplary embodiment, the polymorphic algorithm service may enable an AI framework to monitor the effectiveness of the polymorphic algorithms and their execution at different tiers of the network based on reinforcement learning. The AI framework may also allow information regarding polymorphic algorithm performance to be shared for potential collaboration between different polymorphic algorithms.

In view of the foregoing, the polymorphic algorithm service may optimize the allocation and use of RAN resources to achieve an optimization or network performance target. The polymorphic algorithm service may also provide low churn by re-using the same algorithms across multiple tiers of the network, albeit at different time granularities, based on virtualization. The polymorphic algorithm service may also reduce the complexities of the AI and/or ML framework and the ability to manage coordination in the network based on the goal function normalization. The polymorphic algorithm service may also reduce the resource load by executing a polymorphic algorithm of a metric type at a given tier of the network only when necessary and on a single-tier basis, as described herein. In this way, the polymorphic algorithm service may provide scope reduction and singularity based on reducing the number of polymorphic algorithm instances of the same metric type executing with the same objective across multiple tiers of the network.

The polymorphic algorithm service may also improve the management of network slices, SONs, network optimization, and other attributes or performance-related issues of the network based on the common goal functions of the polymorphic algorithms across multiple tiers of the network, single-tier configuration and optimization strategies (e.g., tier-based optimization and configuration working across various time granularities to obtain an optimal yield) that may be applied.

Figure 1:
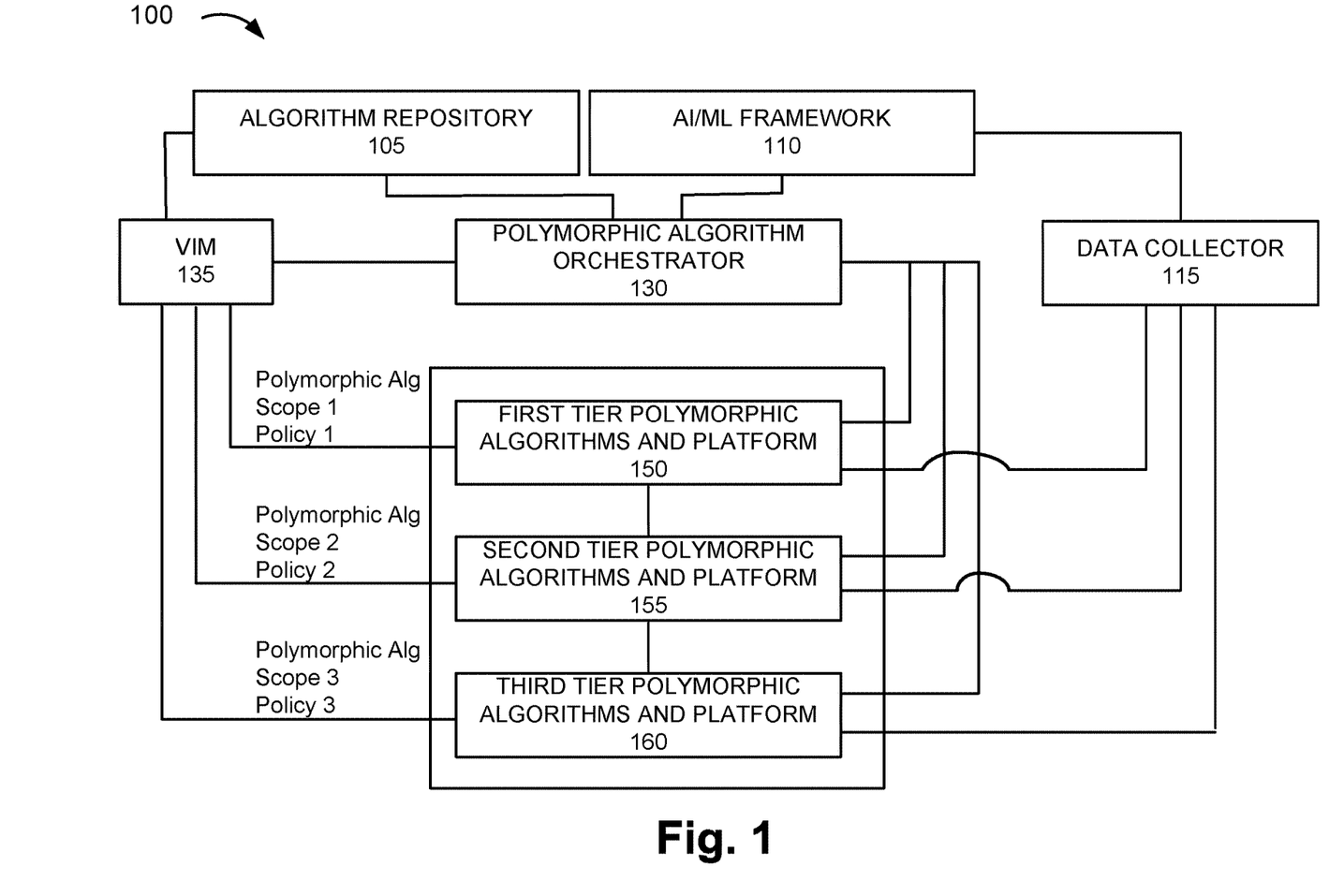
FIG. 1 is a diagram illustrating an exemplary system in which an exemplary embodiment of a polymorphic algorithm service may be implemented.

FIG. 1 is a diagram illustrating an exemplary system 100 in which an exemplary embodiment of the polymorphic algorithm service may be implemented. As illustrated, system 100 includes an algorithm repository 105, an AI/ML framework 110, a data collector 115, a polymorphic algorithm orchestrator 130, a virtualized infrastructure manager (VIM) 135, a first tier polymorphic algorithms and platform 150, a second tier polymorphic algorithms and platform 155, and a third tier polymorphic algorithms and platform 160. According to other exemplary embodiments of system 100, multiple network devices may be combined into a single network device. Additionally, or alternatively, a single network device may be implemented as multiple network devices in which a process or a function may be collaboratively performed or multiple processes or functions may be split between them.

The number, the type, and the arrangement of network devices illustrated in system 100 are exemplary. A network device, a network element, or a network function (referred to as a network device) may be implemented according to one or multiple network architectures, such as a client device, a server device, a peer device, a proxy device, a cloud device, and/or a virtualized network device. Additionally, a network device may be implemented according to various computing architectures, such as centralized or distributed, and may be incorporated into various types of network architectures (e.g., SDN, SON, virtual, logical, network slice, wireless, wired, etc.).

The virtualization technologies and/or virtual network devices described in relation to system 100 are also exemplary. For example, a virtual network device may include a virtualized network function (VNF), a server, a host, a container, a hypervisor, a virtual machine, a network function virtualization infrastructure (NFVI), a network function virtualization orchestrator (NFVO), a virtual network function manager (VNFM), a platform manager and/or other types of virtualization elements, layers, hardware resources, operating systems, engines, etc.

System 100 includes communication links between the network devices. Environment 100 may be implemented to include wired, optical, and/or wireless communication links. A communicative connection via a communication link may be direct or indirect. For example, an indirect communicative connection may involve an intermediary network device not illustrated in FIG. 1. A direct communicative connection may not involve an intermediary network device. The number and the arrangement of communication links illustrated in system 100 are exemplary.

System 100 may include various planes of communication including, for example, a control plane, a service plane, and/or a network management plane. System 100 may include other types of planes of communication. A message communicated in support of the polymorphic algorithm service may use at least one of these planes of communication. Additionally, an interface of a network device may be modified (e.g., relative to an interface defined by a standard, such as 3GPP, International Telecommunication Union (ITU), European Telecommunications Standards Institute (ETSI), GSM Association (GSMA), O-RAN, etc.) or a new interface of the network device may be provided in order to support the communication (e.g., transmission and reception of messages, information elements (IE), attribute value pairs (AVPs), etc.) between network devices that support the polymorphic algorithm service, as described herein. According to various exemplary implementations, the interface of a network device may be a service-based interface, a reference point-based interface, or an O-RAN interface.

Algorithm repository 105 may include a network device that stores polymorphic algorithms that relate to various optimization objectives and/or performance metrics pertaining to a network. The polymorphic algorithms of an optimization objective and/or performance metric may share a normalized goal function across different time granularities and associated tiers of a network. Additionally, according to an exemplary embodiment, the polymorphic algorithms of an optimization objective and/or performance metric may apply the same logic and may use the same inputs, and outputs, albeit at different time granularities. In this way, the polymorphic algorithms may operate in different tiers of a network and provide a consistent goal function. Additionally, such a framework may ensure that the polymorphic algorithms may transition between tiers of a network, enable an AI/ML framework to control sequencing of the polymorphic algorithms in terms of optimization objectives and/or performance metrics and transitioning between tiers, reduce the number of disparate algorithms (e.g., in terms of input/output, optimization logic, goal functions, etc.), and minimize the complexity for management and coordination.

To enforce algorithm singularity based on polymorphism, the polymorphic algorithms of an optimization objective and/or performance metric may include certain features pertaining to their input and their output. For example, the input of the polymorphic algorithms may include a time granularity profile that determines a tier of the network on which the polymorphic algorithm operates, a validity of profile (e.g., a duration for which the profile is valid), a goal function aggregation duration, exit criteria events, such as yield criterion (e.g., converge, diverge), time-series criterion (e.g., transient threshold), error scenario handling, and fidelity and manifest to enable and disable. Additionally, for example, the output of the polymorphic algorithms may include a goal function scaling per network tier, a goal-to-yield realization, a self convergence check (e.g., using ML), a self assurance check (e.g., using ML), and an output profile format per time granularity profile.

According to an exemplary embodiment, the polymorphic algorithms may relate to self-configuring, self-optimizing, and/or self-healing. Within these genres, the polymorphic algorithms may include context algorithms (e.g., type of cell/sector/site, indoor, dense, urban, etc.), mobility algorithms (e.g., stationary, mobile, speed, direction of end device, etc.), coverage algorithms, quality algorithms, capacity algorithms, and energy algorithms (e.g., turn off a cell or sector, provide other energy conservation mechanisms that may minimize energy usage of a radio access device). The projected yield of the network may be calculated based on the amount of spectrum, how the resources are being utilized by the device types and services offered, network slices being serviced at the radio nodes, and other factors. RAN optimization may be orchestrated by the autonomous AI/ML framework 110 and polymorphic algorithm orchestrator 130 in view of the polymorphic algorithms.

AI/ML framework 110 may include a network device that includes AI and/or ML logic. For example, AWL framework 110 may include various learning-based and/or intelligence logic, such as reinforcement-based learning, unsupervised learning, semi-supervised learning, supervised learning, deep learning, and/or artificial intelligence. AI/ML framework 110 may analyze output data from first tier polymorphic algorithms and platform 150, second tier polymorphic algorithms and platform 155, and third tier polymorphic algorithms and platform 160 via data collector 115 to determine whether a goal function is being met based on policies (e.g., related to thresholds, triggers, etc.) and various analytical assessments (e.g., related to traffic patterns, cost function, time-series, telemetry, network location, anomalies, etc.) to optimize and/or reach a performance target in relation to nodes of a tier of the network.

Data collector 115 may include a network device that collects output data from first tier polymorphic algorithms and platform 150, second tier polymorphic algorithms and platform 155, and third tier polymorphic algorithms and platform 160. The output data may relate to various network devices of a radio access network, as described herein.

Polymorphic algorithm orchestrator 130 may include a network device that orchestrates the polymorphic service provided by first tier polymorphic algorithms and platform 150, second tier polymorphic algorithms and platform 155, and third tier polymorphic algorithms and platform 160 via VIM 135. Polymorphic algorithm orchestrator 130 may orchestrate virtual instances of the polymorphic algorithms at various tiers of the network, such as instantiation, deletion, suspension, transition to another tier, etc., based on feedback from AI/ML framework 110, policies, and goals/cost functions pertaining to the various types of polymorphic algorithms. The policies may include tier configuration policies, which may be driven by AI/ML, framework 110, for selecting the polymorphic algorithm type and radio access nodes, cluster of radio access nodes, etc. Additionally, the policies may include tier exit criterion policies. For example, the tier exit policies may include static triggers and trigger thresholds for a radio access node, a cluster of radio access nodes, or some other grouping of nodes. In this way, a threshold or a rule involving the threshold within a policy may indicate how and when a polymorphic algorithm may automatically transition from one tier to another tier of the network, for example.

VIM 135 may include a network device that controls and manages compute, storage, and network resources of an NFV Infrastructure (NFVI) that support the polymorphic algorithms operating at a tier of the network by first tier polymorphic algorithms and platform 150, second tier polymorphic algorithms and platform 155, and third tier polymorphic algorithms and platform 160. VIM 135 may manages the types of polymorphic algorithms operating and their state based on communications with polymorphic algorithm orchestrator 130 and algorithm repository 105.

First tier polymorphic algorithms and platform 150 includes network devices that host polymorphic algorithms. For example, first tier polymorphic algorithms and platform 150 may include one or multiple virtualization technologies, as described herein. According to an exemplary embodiment, the polymorphic algorithms of the first tier may operate at a longer time granularity relative to the second tier and the third tier. First tier polymorphic algorithms and platform 150 may also have a different scope (e.g., virtual network core) than the scopes of the second tier and the third tier, as described herein.

Second tier polymorphic algorithm and platform 155 includes network devices that host polymorphic algorithms. For example, second tier polymorphic algorithms and platform 155 may include one or multiple virtualization technologies, as described herein. According to an exemplary embodiment, the polymorphic algorithms of the second tier may operate at a longer time granularity relative to the third tier. Second tier polymorphic algorithms and platform 155 may also have a different scope (e.g., virtual network edge) than the scopes of the first tier and the third tier, as described herein.

Third tier polymorphic algorithms and platform 160 includes network devices that host polymorphic algorithms. For example, third tier polymorphic algorithms and platform 160 may include one or multiple virtualization technologies, as described herein. According to an exemplary embodiment, the polymorphic algorithms of the third tier may operate at a shorter time granularity relative to the first tier and the third tier. Third tier polymorphic algorithms and platform 160 may also have a different scope (e.g., virtual network far edge) than the scopes of the first tier and the third tier, as described herein.

Figure 2:
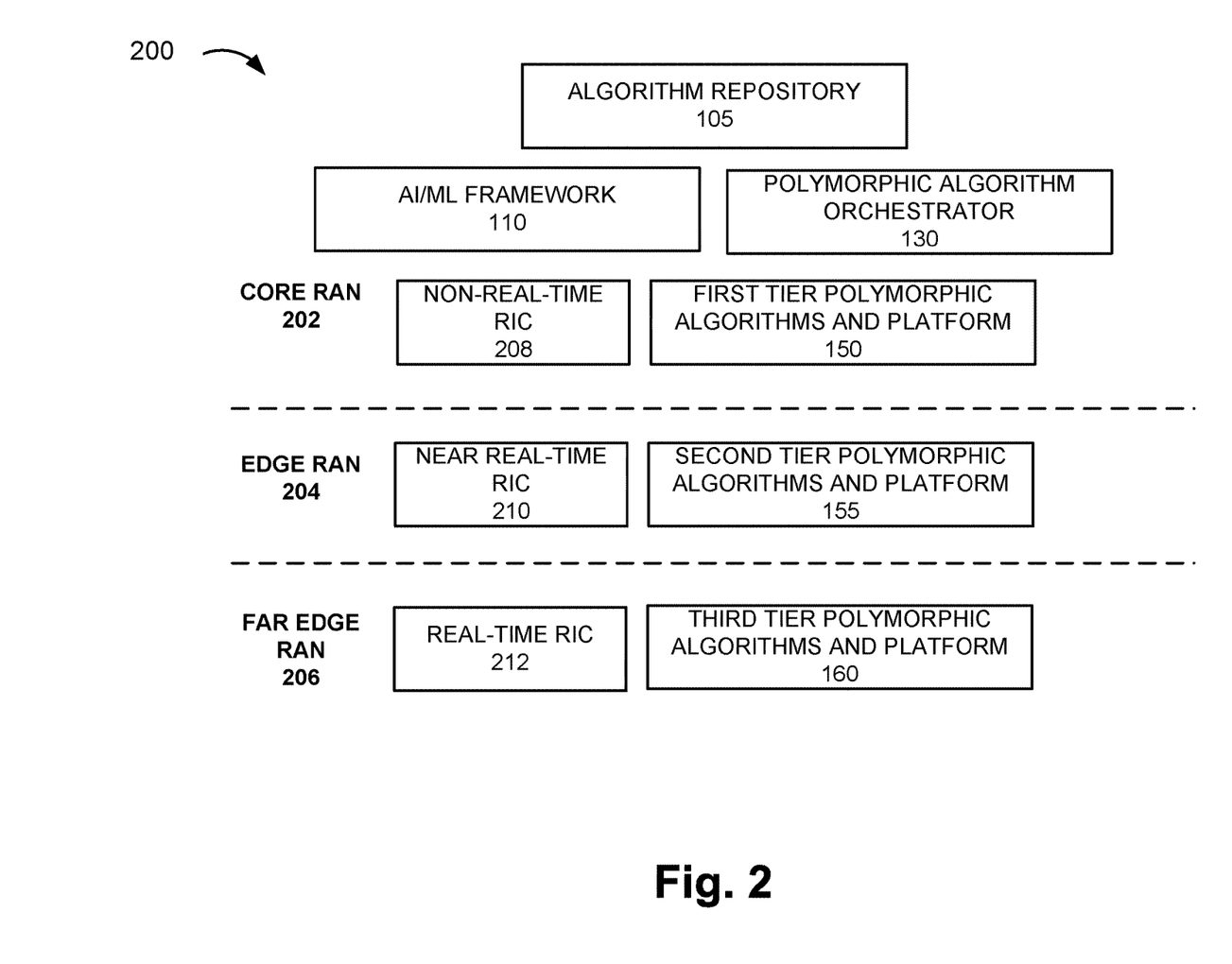
FIG. 2 is a diagram illustrating an exemplary environment in which an exemplary embodiment of the polymorphic algorithm service may be implemented.

FIG. 2 is a diagram illustrating an exemplary environment in which the polymorphic service may be implemented in a network. As illustrated, a network 200 may include a core RAN 202, an edge RAN 204, and a far edge RAN 206 that correspond to different tiers of the network. Core RAN 202 may include algorithm repository 105, AI/ML framework 110, polymorphic algorithm orchestrator 130, and first tier polymorphic algorithms and platform 150. Additionally, core RAN 202 may include a non-real-time RAN Intelligent Controller (MC) 208. Non-real-time MC 208 may support non-real-time intelligent radio resource management, higher layer procedure optimization, and policy optimization in a RAN. For example, non-real-time MC 208 may control and optimize various radio resources, such as network slicing associated with a 5G or future RAN, or radio bearers associated with a 4G RAN. Edge RAN 204 may include second tier polymorphic algorithms and platform 155 and a near real-time MC 210. Near real-time RIC 210 may support near real-time intelligent radio resource management, QoS management, connectivity management, and handover management in a RAN. For example, near real-time MC 210 may control and optimize various radio resources, such as the selection of radio access devices (e.g., evolved Node B (eNB), centralize unit (CU), next generation Node B (gNB), etc.) associated with a 4G, 5G, or future RAN. Far edge RAN 206 may include third tier polymorphic algorithms and platform 160 and a real-time RIC 212. Real-time RIC 212 may support real-time intelligent radio resource management. For example, real-time RIC 212 may control and optimize various radio resources of radio access devices (e.g., eNB, radio unit (RU), remote radio head (RRH), etc.), gNB, distributed unit (DU), etc.) associated with a 4G, 5G, or future RAN, radio resource scheduling for uplink and downlink communication with an end device, and radio signal characteristics (e.g., modulation, beam management, etc.). According to an exemplary embodiment, the polymorphic algorithm service may be implemented in an O-RAN) architecture or another type of radio access network. The number of tiers of network 200 is exemplary.

Figure 3:
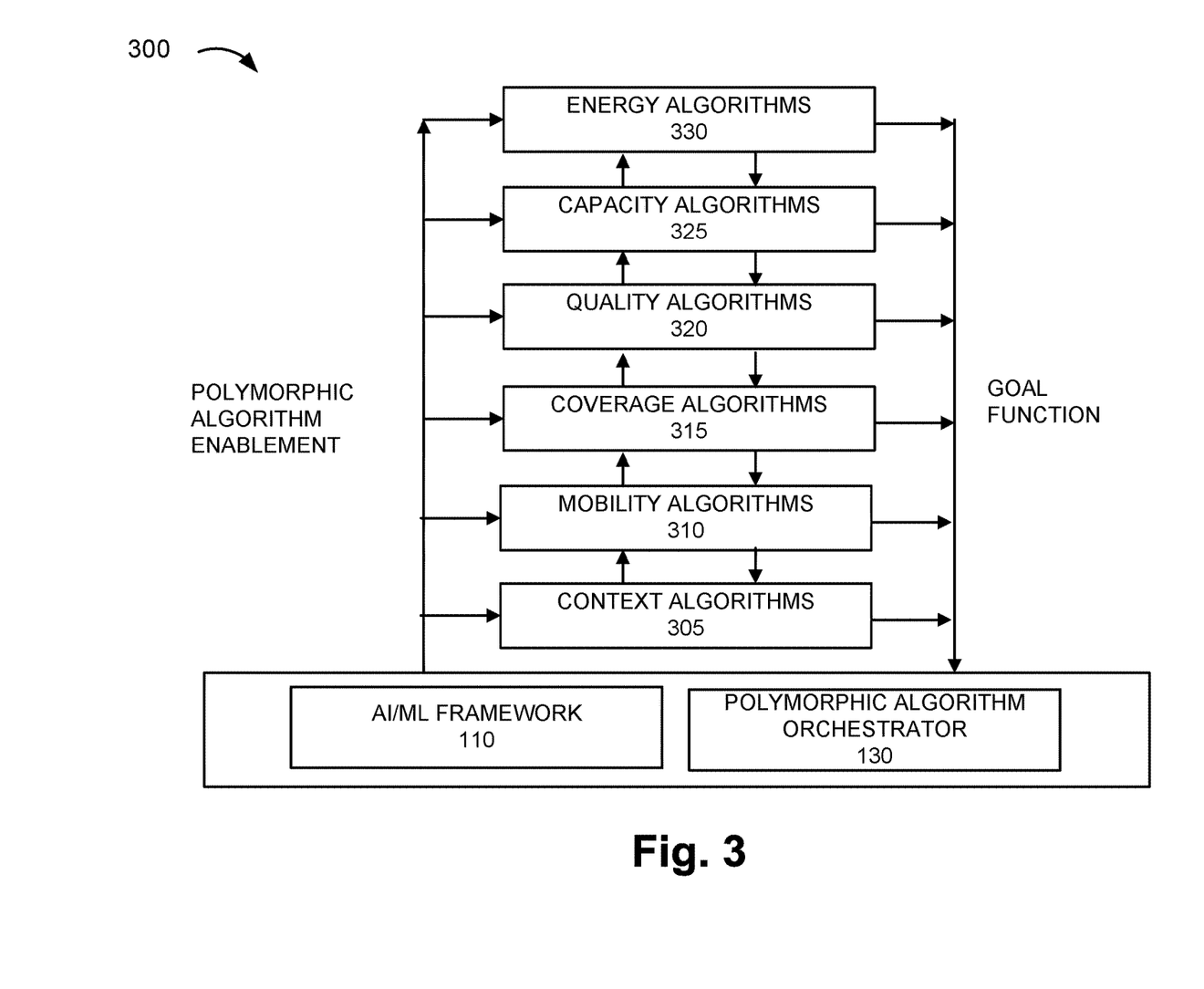
FIG. 3 is a diagram illustrating an exemplary process of exemplary polymorphic algorithms of the polymorphic algorithm service.

As previously described, the polymorphic algorithm may relate to self-configuring, self-optimizing, and/or self-healing genres. Within these genres or categories, the polymorphic algorithms may include context algorithms, mobility algorithms, coverage algorithms, quality algorithms, capacity algorithms, and energy algorithms. FIG. 3 is a diagram illustrating an exemplary process of the polymorphic algorithm service. As illustrated of a process 300, AI/ML framework 110 and polymorphic algorithm orchestrator 130 may control the enablement of a set of polymorphic algorithms that include context algorithms 305, mobility algorithms 310, coverage algorithms 315, quality algorithms 320, capacity algorithms 325, and energy algorithms 330.

Unlike typical approaches, the polymorphic algorithm service may not manage, for example, the same cell sites from multiple tiers using the same type of polymorphic algorithms. That is, for example, AI/ML framework 110 and polymorphic algorithm orchestrator 130 may not have coverage algorithms 315 operating at far edge RAN 206 and edge RAN 204 relating to the same radio access device, cluster of radio access devices that include the radio access device, etc. Rather, AI/ML, framework 110 and polymorphic algorithm orchestrator 130 may manage, for example, coverage using the coverage algorithms 315 at core RAN 202, and if optimization or a target performance is not being reached, AWL framework 110 and polymorphic algorithm orchestrator 130 may suspend or terminate the virtual instances of coverage algorithms 315 at core RAN 202 and may instantiate the coverage algorithms 315 to operate at edge RAN 204. Similarly, if optimization or a target performance is not being reached at edge RAN 204, AI/ML framework 110 and polymorphic algorithm orchestrator 130 may suspend or terminate the virtual instances of coverage algorithms 315 at edge RAN 204 and may instantiate the coverage algorithms 315 to operate at far edge RAN 206. As illustrated in FIG. 3, the output of the polymorphic algorithms, which includes data relating to the goal function, may be provided to AI/ML framework 110, and determinations may be made whether there is convergence, divergence, etc. toward or away from the goal of the polymorphic algorithm type. A yield goal and the goal function may have the same unit of measure.

As previously described, the polymorphic algorithms may operate at different and distinct time granularities, and may pertain to different scopes (e.g., in terms of number and types of radio access devices). Also, the polymorphic algorithms of the same type may have the same unit for yield goals and goal functions.

Referring to FIG. 3, according to an exemplary embodiment of the polymorphic algorithm service, the polymorphic algorithms may attain optimization or a performance target by orchestrating the order of the polymorphic algorithms based on their type. For example, polymorphic algorithm orchestrator 130 may select to initially operate the context algorithms 305, followed by mobility algorithms 310, coverage algorithms 315, quality algorithms 320, capacity algorithms 325, and energy algorithms 330. According to other exemplary embodiments, the order of the type of polymorphic algorithms may be different. Additionally, according to an exemplary embodiment, the transition of running one type of polymorphic to another type may be dependent on successful optimization or attainment of a performance target related to the polymorphic algorithm type, a configured time period, a failure to optimize or attain the performance target, and/or some other criterion. As an example, when mobility has been optimized, coverage algorithms 315 may be instantiated to achieve optimization for coverage while sustaining the optimized state for mobility. In this regard, when a steady state or yield of a polymorphic algorithm type is achieved, the polymorphic algorithm service may transition to a next polymorphic algorithm type. Conversely, if the goal function of a polymorphic algorithm type is regressing (e.g., at far edge RAN 206) for mobility, the polymorphic algorithm service may not progress to coverage algorithms 315, but may back out and go to a next group of cells relating to mobility.

According to an exemplary embodiment, the polymorphic algorithm service may instantiate a polymorphic algorithm of metric type in any tier based on feedback from AWL framework 110. For example, polymorphic algorithm orchestrator 130 may instantiate a polymorphic algorithm relating to coverage in first tier polymorphic algorithms and platform 150. The goal function may be computed and provided to AI/ML framework 110. Based on the detection of a change in pattern or regression of the goal function, or a prediction with hyper-parameter variance for a radio access node or cluster of radio access nodes, polymorphic algorithm orchestrator 130 may suspend the polymorphic algorithm in the first tier, initiate instantiation of the polymorphic algorithm of the metric type in second tier polymorphic algorithms and platform 155. The goal function may be monitored for improvements. For example, AI/ML framework 110 may determine whether the performance pertaining to coverage has improved for a cluster of radio access nodes. If for example, convergence has occurred (e.g., improvement), polymorphic algorithm orchestrator 130 may suspend the polymorphic algorithm in the second tier, and transfer control to back to the first tier. If for example, divergence has occurred (e.g., not improved), polymorphic algorithm orchestrator 130 may suspend the polymorphic algorithm in the second tier, and instantiate the polymorphic algorithm relating to coverage in third tier polymorphic algorithms and platform 160. In this way, the execution of the polymorphic algorithms may transitions back and forth, in some cases, between different tiers of the network.

Figure 4:
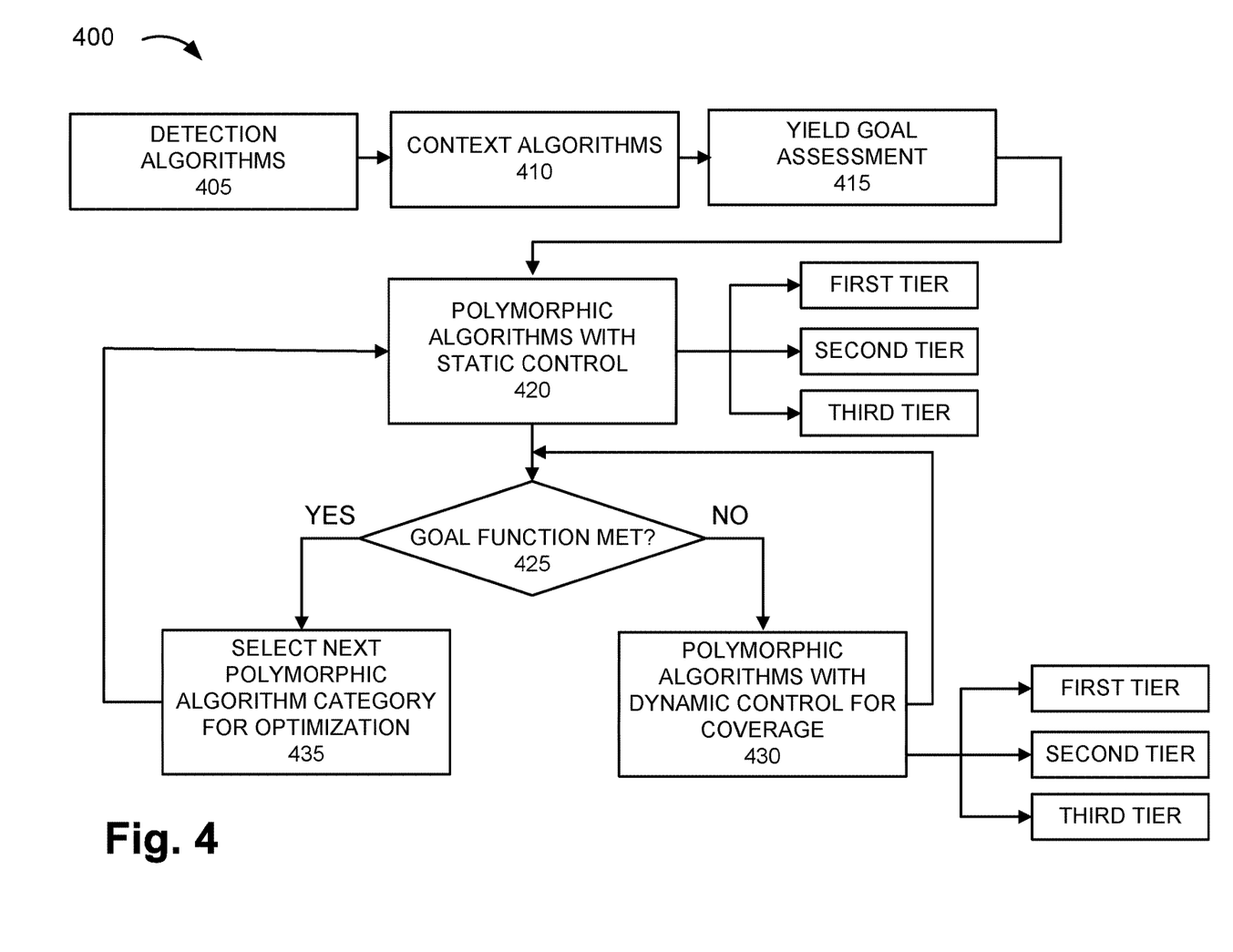
FIG. 4 is a diagram illustrating an exemplary process of an exemplary embodiment of the polymorphic algorithm service.

FIG. 4 is a diagram illustrating an exemplary process of an exemplary embodiment of the polymorphic algorithm service. As illustrated, a process 400 may include, in block 405, the execution of detection algorithms. For example, the detection algorithms may use AI, ML, and/or statistical-based clustering based on relevance. By way of further example, the clustering may relate to radio access devices and/or geographic areas of a network (e.g., a radio access network) and the relevance may relate to traffic, volume or node density, and/or other criteria. In block 410, process 400 may include the execution of context algorithms. For example, the context algorithms may pertain characteristics of a cluster, such as density, mobility, indoor, and/or another type of attribute. In block 415, process 400 may include a yield goal assessment. For example, the yield goal assessment may include analyzing the spectral resources available versus actual utilization based on measured empirical data.

In block 420, process 400 may include the execution of a type of polymorphic algorithm with static control. For example, based on FIG. 3, the polymorphic algorithm service may execute mobility algorithms based on static controls, such as initial or default parameters and initial or default values relating to mobility. As illustrated in FIG. 4, the execution of the type of polymorphic algorithm with static control (e.g., mobility) may occur at a first tier, a second tier, and/or a third tier of the network depending on the convergence towards or divergence from mobility optimization, as previously described. In block 425, process 400 may determine whether the goal function has been met or similar criterion (e.g., the goal function has improved and/or within a certain threshold of the goal function) has been met. When the goal function has not been met (block 425-NO), the execution of the type of polymorphic algorithm with dynamic control (e.g., mobility) may occur at a first tier, a second tier, and/or a third tier of the network. For example, the polymorphic algorithms with dynamic control may adjust the initial, default, or current parameters and values so as to improve the yield (e.g., mobility optimization). When the goal function has been met (block 425-YES), in block 435, process 400 may include selecting a next polymorphic algorithm category for optimization. For example, referring to FIG. 3, process 400 may include selecting coverage algorithms to use optimize coverage. Process 400 may return to block 420, in which the coverage algorithms with static control may be executed. Process 400 may perform further iterations in a similar manner and may transition to other dimensions of optimization (e.g., quality, capacity, etc.), as previously described. When the goal function has not been met (block 425-NO), a further iteration of polymorphic algorithms with dynamic control coverage may be performed at the same or a different tier of the network, as previously described.

Figure 5:
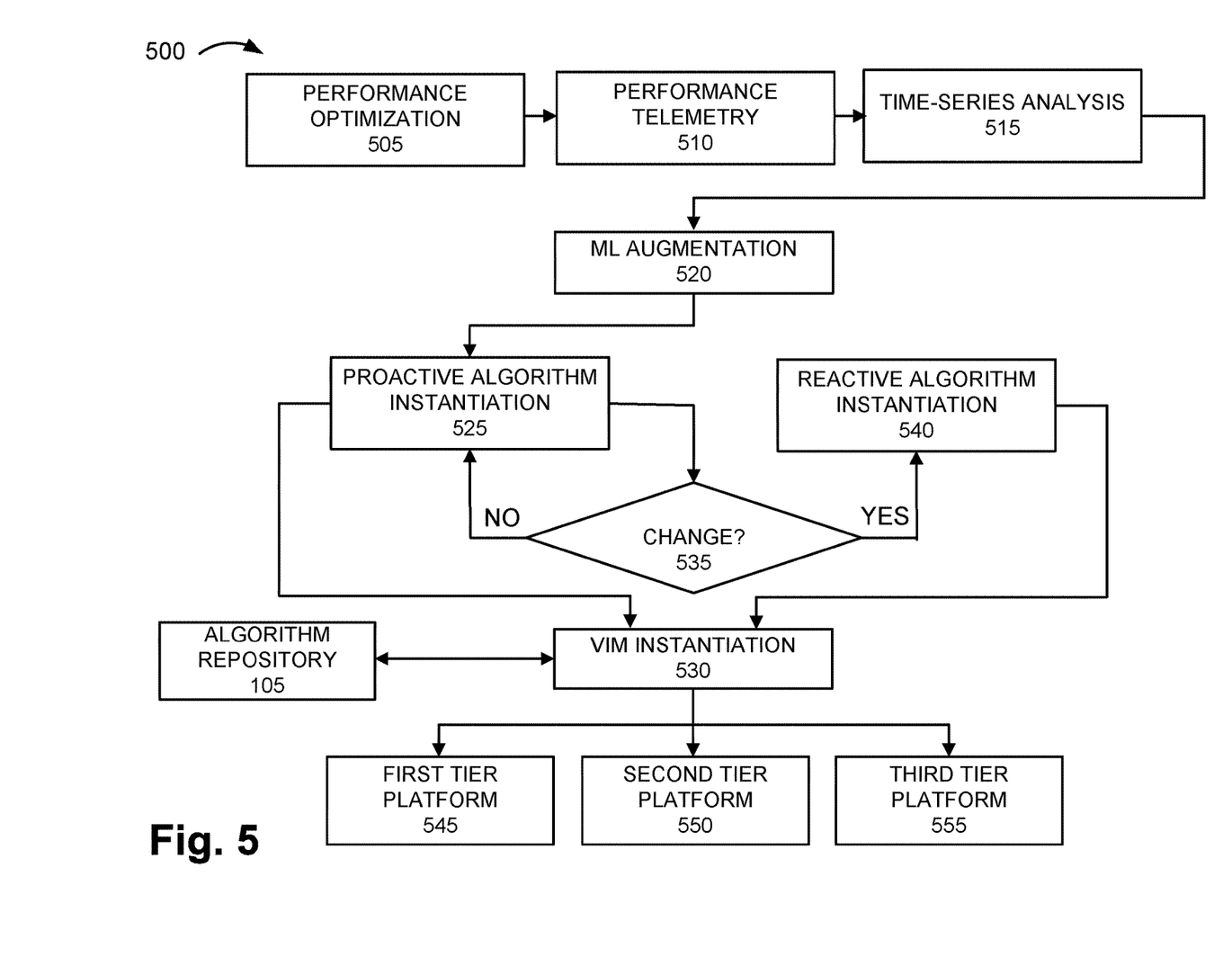
FIG. 5 is a diagram illustrating another exemplary process of an exemplary embodiment of the polymorphic algorithm service.

FIG. 5 is a flow diagram illustrating another exemplary process of an exemplary embodiment of the polymorphic algorithm service. For example, in block 505 of a process 500, the polymorphic algorithm service may optimize performance in the network. For example, the optimization may relate to traffic demand (e.g., latency, throughput, and/or another performance metric), optimization of goal demands (e.g., mobility, coverage, quality, capacity, energy, etc.), and traffic pattern thresholds (e.g., transient, predicted, etc.). The polymorphic algorithm service may optimize based on telemetry performance (e.g., real-time, non-real-time, near real-time, or another time granularity) (block 510), time series analysis (e.g., detection of deterministic changes, detection of non-deterministic changes)(block 515), and ML augmentation (e.g., anomaly detection, predictive analytics) (block 520).

The polymorphic algorithm service may operate at different tiers of a network and may involve different scopes of radio access devices, as previously described, such as a cell of relevance, a cluster of cells of relevance, or some other type of area of the network of relevance. As illustrated, in block 525, proactive algorithms may be instantiated. For example, in block 530, VIM instantiation of a polymorphic algorithm type may occur at the first tier platform 545, second tier platform 550, or third tier platform 555. The type of polymorphic algorithm may be selected based on a sequential order for optimization, as previously described. Subsequent to execution, in block 535, the status of the network tier may be determined. For example, the polymorphic algorithm service may determine the status of the yield relating to the polymorphic algorithm, such as whether the yield is diverging, converging, or remaining in a steady state. According to another example, the polymorphic algorithm service may determine the status of traffic demand (e.g., increase, decrease, steady state, etc.) and/or other attribute of the network. When the status is yield is diverging, for example, in block 540, a reactive polymorphic algorithm instantiation may occur. For example, as a matter to offset the determined change towards a steady state or convergence, a polymorphic algorithm of the type may be instantiated at the first tier platform 545, second tier platform 550, or third tier platform 555. The reactive polymorphic algorithm type may alter parameter or configuration values relative to those of the proactive algorithm instance.

Figure 6:
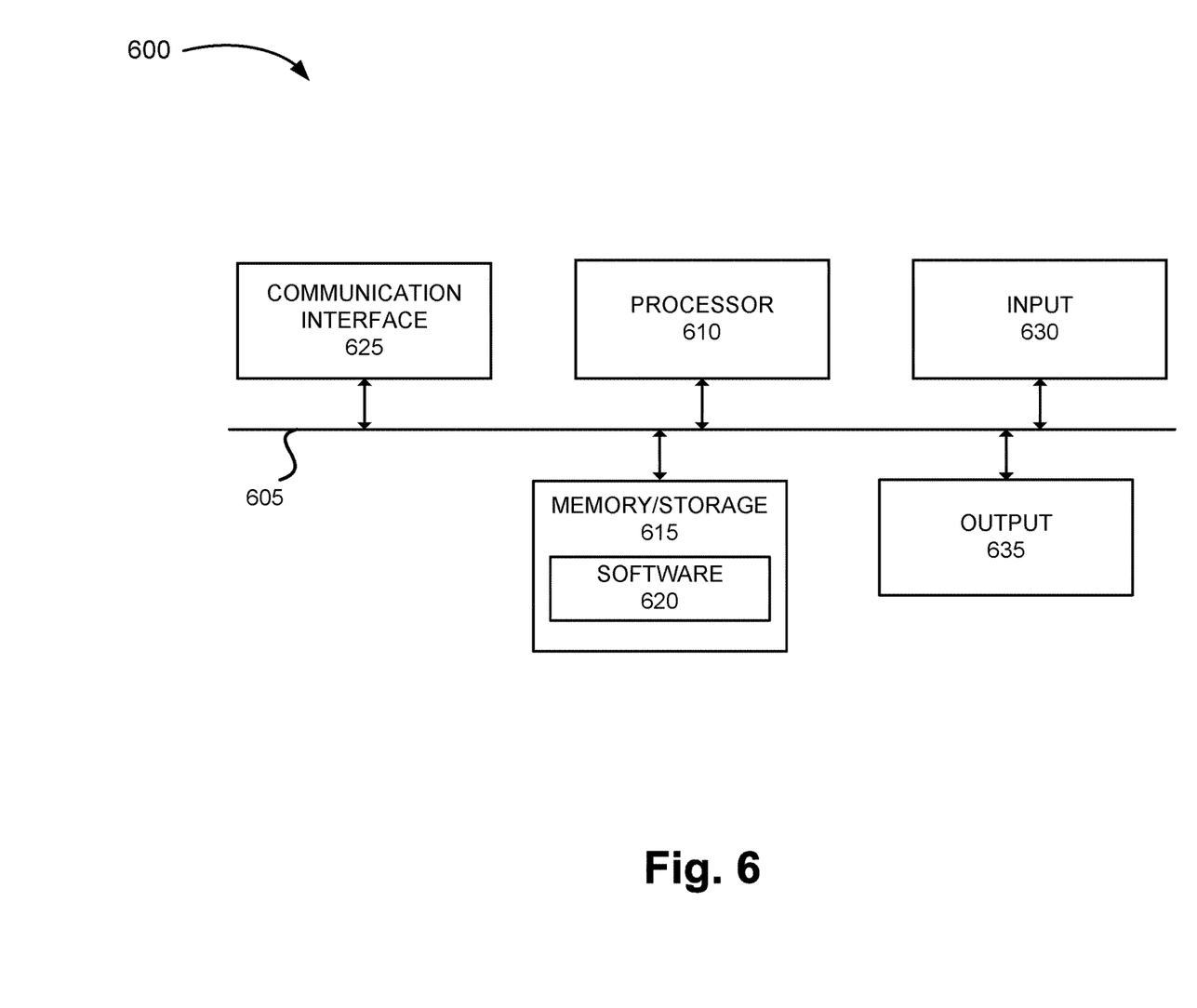
FIG. 6 is a diagram illustrating exemplary components of a device that may correspond to one or more of the devices illustrated and described herein.

FIG. 6 is a diagram illustrating exemplary components of a device 600 that may be included in one or more of the devices described herein. For example, device 600 may correspond to AI/ML framework 110, data collector 115, polymorphic algorithm orchestrator 130, VIM 135, first tier polymorphic algorithms and platform 150, second tier polymorphic algorithms and platform 155, third tier polymorphic algorithms and platform 160, non-real-time RIC 208, near real-time RIC 210, real-time RIC 212, and/or other types of network devices, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 615 may store data, software, and/or instructions related to the operation of device 600.

Software 620 includes an application or a program that provides a function and/or a process. As an example, with reference to system 100 and/or other network devices, software 620 may include an application that, when executed by processor 610, provides a function of the polymorphic algorithm service and/or the 3D-MIMO service, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service based interface, or a reference interface, for example.

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 600 may be implemented in the same manner. For example, device 600 may be instantiated, created, deleted, or some other operational state during its life-cycle (e.g., refreshed, paused, suspended, rebooted, or another type of state or status), using well-known virtualization technologies (e.g., hypervisor, container engine, virtual container, virtual machine, etc.) in a RAN network and/or another type of network (e.g., a core network, an application layer service network, a multi-access edge computing (MEC) network, etc.).

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

As previously described, the polymorphic algorithm service may be implemented in various RAN architectures, such as a Fourth Generation (4G) RAN (e.g., an Evolved UMTS Terrestrial Radio Access Network (E-UTRAN) of a Long Term Evolution (LTE) network), a 4.5G RAN (e.g., an E-UTRAN of an LTE-Advanced (LTE-A) network, a RAN of an LTE-A Pro network), a next generation RAN (e.g., a Fifth Generation (5G)-access network (5G-AN) or a 5G-RAN (referred to herein as simply a 5G-RAN)), an O-RAN architecture, a RAN that includes RICs (e.g., non-real-time, near real-time, real-time, and/or other types of RICs or number thereof) that may operate at different and/or distinct time granularities and/or tiers of a network.

According to an exemplary embodiment, the polymorphic algorithm service may support a three-dimensional Multiple-Input Multiple Output (3D-MIMO) service. 3D-MIMO antennas may improve capacity, latency, coverage, and reliability, among other things. For example, remote electrical tilting (RET) may be used with 3D-MIMO antennas. However, a service-based network may benefit from a more service-agile 3D-MIMO system.

According to an exemplary embodiment, the RIC service of the polymorphic algorithm service may include an Open Interoperable MC for 3D-MIMO. According to various exemplary embodiments, the 3D-MIMO service may be included in an O-RAN platform. According to other exemplary embodiments, the 3D-MIMO service may be included in another type of RAN architecture.

According to an exemplary embodiment, an antenna profile may be optimized at various layers or tiers of a RAN, such as from cluster level to neighbor sites to an individual cell site. According to an exemplary embodiment, the antenna profile may be optimized by a non-real-time RIC and a near real-time RIC, as well as beam management at a radio control unit. The antenna profile change may be updated with various parameters and/or parameter values in a database or other data storage structure, and used by various controllers in the RAN. According to various exemplary embodiments, the antenna profile changes may be driven by various criteria, such as locations of the network slices, types of end devices, and types or categories of application layer services. The antenna profiles may be orchestrated between the cluster of radio access devices and a radio access device.

According to various exemplary embodiments, the antenna profiles may be configured in a static manner for clusters of radio access devices and radio access devices where changes may be deterministic, or may be configured in a dynamic manner where changes are non-deterministic. In either case, both static and dynamic changes may be orchestrated so as to improve a collective yield for a cluster or radio access device.

Referring back to FIG. 2, non-real-time RIC 208 may include logic for 3D-MIMO. For example, non-real-time RIC 208 may optimize cluster traffic steering, cluster network, and user performance. Non-real-time MC 208 may recommend setting and policies for near real-time MC 210 and 3D-MIMO. An antenna change, such as 3D-antenna tilting and direction, may impact second and third tier cell sites. The antenna change may lead to other cluster and non-real-time optimization, such as Automatic Neighbor Relation (ANR), Physical Cell Identity (PCI), and/or other aspects of a network.

Near real-time RIC 210 may process recommendations from non-real-time MC 208. Near real-time RIC 210 for 3D-MIMO may optimize, for example, multiple transmit and receive ports co-located at the same location and distributed at different locations, 3D-shaping, the number of beams and beam characteristics. For example, near real-time RIC 210 may select the best panel and beam characteristics for uplink transmission. The antenna change may impact the performance of adjacent cell sites. Mobility management and load balancing across cell sites may be provided, such as mobility robustness optimization (MRO) and mobility load balancing (MRB), so as to improve Key Performance Indicators (KPIs) relating to handover and load balancing. Near real-time RIC 210 may also recommend settings and policies for real-time RIC 212 for 3D-MIMO optimization.

Real-time RIC 212 may process recommendations from near real-time RIC 210, such as beam characteristics. Real-time RIC 212 for 3D-MIMO may optimize, for example, beam selection and switching, radio scheduling at a radio access device (e.g., a CU, a DU, etc.), the number of simultaneous users on one or multiple beams, and/or other factors related to beam management. The radio access device may determine and schedule the radio resources and the beam based on user equipment (UE) feedback (e.g., real-time feedback), beam identifiers, and modulation and coding schemes, for example.

Figure 7:
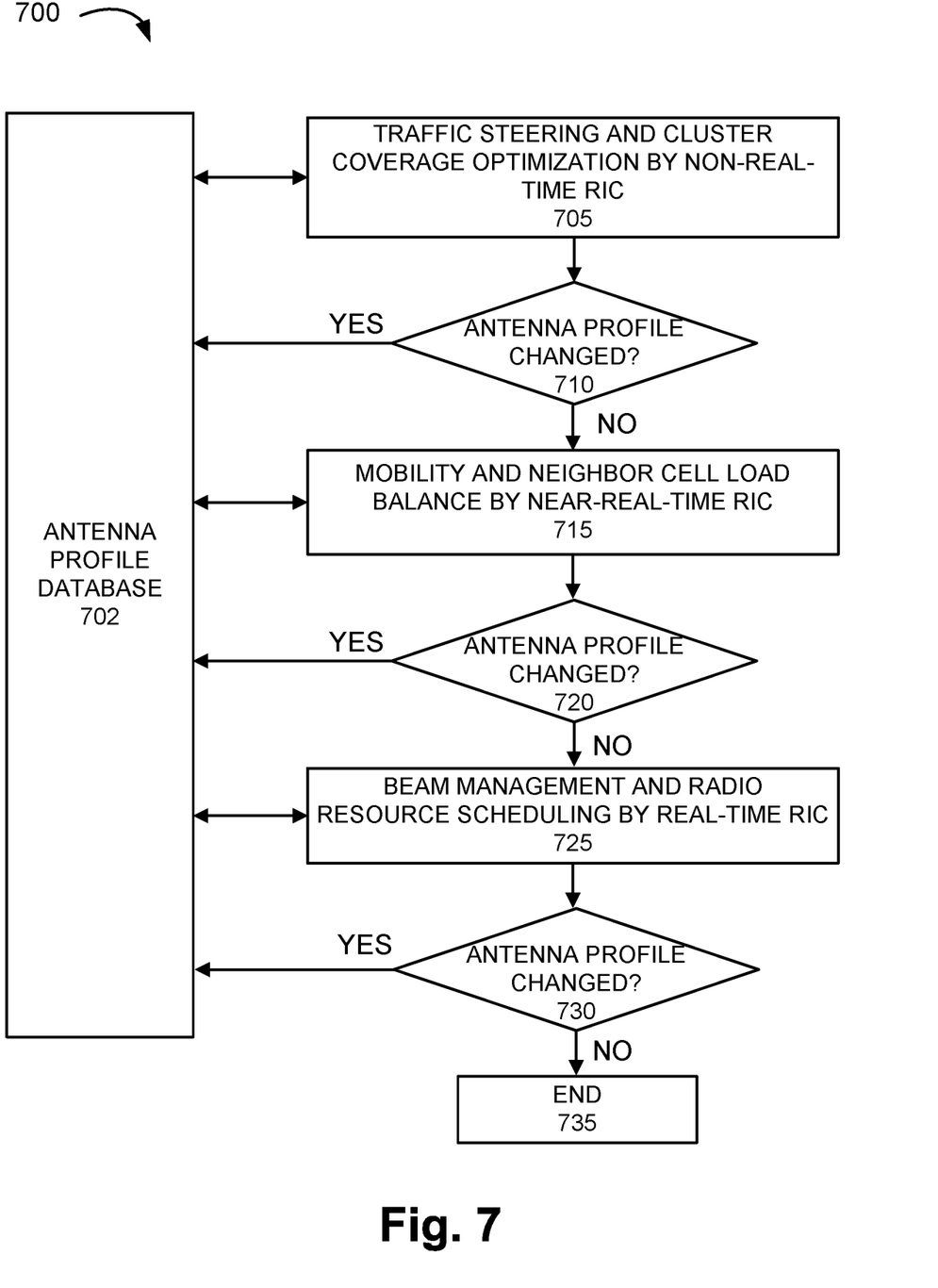
FIG. 7 is a flow diagram illustrating an exemplary process of an exemplary embodiment of a 3D-Multiple Input Multiple Output (MIMO) service.

FIG. 7 is a flow diagram illustrating an exemplary process 700 of an exemplary embodiment of the 3D-MIMO service. According to an exemplary embodiment, network 125 may perform the steps of process 700. According to an exemplary implementation, processor 610 executes software 620 to perform a step of process 700, as described herein. Alternatively, a step may be performed by execution of only hardware. The performance of a step of process 700 may include a RIC and an antenna profile database 702. Process 700 may be performed iteratively. According to an exemplary embodiment, the polymorphic service may use the 3D-MIMO service for optimizing coverage and quality.

Antenna profile database 702 may store configurations relating to 3D-MIMO optimization. The configurations may include static configurations and dynamic configurations. For example, the configurations may include 3D-antenna tilting and direction parameters and values, beam shaping parameters and values (e.g., 3D-shaping, number of beams, beam characteristics, transmit/receive ports, etc.), and beam selection parameters and values (e.g., beam selection, beam switching, radio scheduling, number of simultaneous users using a beam, number of ranks, modulation coding schemes, etc.). According to various exemplary embodiments, antenna profile database 702 may be accessed via various open and standard interfaces, such as A1, O1, E2, X2-c, X2-u, NG-u, NG-c, Xn-u, Xn-c, F1-c, F1-u, and fronthaul interfaces, as well as various open and standard RAN devices, such as O-enB, O-CU-CP, O-CU-UP, O-DU, O-RU, gNB, RU, DU, CU, eNB, RRH, and so forth.

Referring to FIG. 7, in block 705, a non-real-time RIC may optimize traffic steering and cluster coverage based on the selection and use of 3D-MIMO antenna tilting and direction configurations (e.g., static, dynamic) of antenna profile database 702. Based on changes that may occur in the network over time at various locations, the non-real-time RIC may monitor (e.g., from a centralized perspective) the locations in the network and may or may not adapt or tweak an antenna profile. In block 710, it may be determined whether an antenna profile has been changed. For example, a parameter value and/or a range of permissible parameter values may change. If so, in block 710-YES, the optimized antenna profile may be stored in antenna profile database 702. If not, in block 710-NO, process 700 may continue to block 715. In block 715, a near real-time RIC may optimize mobility and neighbor cell load balance based on the selection and use of 3D-MIMO beam shaping characteristic configurations (e.g., static, dynamic) of antenna profile database 702. Based on changes that may occur in the network over time at various locations, the near real-time MC may monitor (e.g., from a near edge perspective) the locations in the network and may or may not adapt or tweak an antenna profile. In block 720, it may be determined whether an antenna profile has changed. For example, a parameter value and/or a range of permissible parameter values may change. If so, in block 720-YES, the optimized antenna profile may be stored in antenna profile database 702. If not, in block 720-NO, process 700 may continue to block 725. In block 725, a real-time RIC may optimize beam management and radio resource scheduling based on the selection and use of 3D-MIMO beam selection, MCS, number of ranks, etc., configurations (e.g., static, dynamic) of antenna profile database 702. Based on changes that may occur in the network over time at a location, the real-time RIC may monitor (e.g., from a far edge perspective) the location in the network and may or may not adapt or tweak an antenna profile. In block 730, it may be determined whether an antenna profile has changed. For example, a parameter value and/or a range of permissible parameter values may change. If so, in block 730-YES, the optimized antenna profile may be stored in antenna profile database 702. If not, in block 720-NO, process 700 may end (block 735).

FIG. 7 illustrates an exemplary process 700 of the 3D-MIMO service, however, according to other embodiments, process 700 may include additional operations, fewer operations, and/or different operations than those illustrated in FIG. 7, and described herein. For example, process 700 may include a step in which an optimization was successful or not. For example, before block 715, non-real-time RIC may determine that a cluster of cell sites were not optimized for coverage. Similar to that previously described in relation to the polymorphic algorithm service, optimization may propagate to lower tier of the network in which near real-time RIC may attempt to optimize coverage based on the beam shaping configurations for that cluster of cell sites that have not been optimized. Depending on the outcome, further optimization may or may not occur at the real-time RIC. For example, assume that one cell site of the cluster of cell sites still is not optimized for coverage. The real-time RIC may optimize coverage based on beam selection and/or other configurations mentioned. In this way, the 3D-MIMO service and more generally the polymorphic algorithm service may provide a holistic solution to optimize various criteria (e.g., mobility, coverage, quality, etc.) based on the behavior of the network, the transition to different tiers of the network, policies (e.g., triggers, thresholds), and time granularities. Additionally, for example, an orchestrator (e.g., polymorphic algorithm orchestrator 130) and an AWL framework (e.g., AWL framework 110) may include logic that supports the 3D-MIMO service. For example, the orchestrator may make network tier determinations (e.g., transition), virtual instance configuration determinations, trigger detection and adjustment determinations, as well as other intelligence described in relation to the polymorphic algorithm service. The AI/ML framework may also provide ML and/or AI services to support various optimizations, as described herein, in relation to the 3D-MIMO service.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive. As an example, the polymorphic algorithm service may be applied to any information system that includes multiple functional elements managed by a multi-tiered system (e.g., having different granularities) in which singular algorithms can manifest at different tiers in an autonomous manner.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in the Figures, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    instantiating, by a device of a multi-tier network, a first polymorphic algorithm of a first type of radio access network optimization in a first tier of the multi-tier network, wherein the first polymorphic algorithm is configured to optimize based on a first time granularity;
    determining, by the device, whether the first type of radio access network optimization is satisfied based on the first polymorphic algorithm;
    suspending, by the device, the first polymorphic algorithm in the first tier, when determining that the first type of radio access network optimization did not occur at one or more first locations of the multi-tier network; and
    instantiating, by the device, a second polymorphic algorithm of the first type of radio access network optimization in a second tier of the multi-tier network, wherein the second polymorphic algorithm is configured to optimize based on a second time granularity that is different from the first time granularity.

2. The method of claim 1, wherein the first type of radio access network optimization relates to mobility, coverage, quality, or capacity.

3. The method of claim 1, wherein the first polymorphic algorithm and the second polymorphic algorithm include a common goal function.

4. The method of claim 1, further comprising:
    determining, by the device, whether the first type of radio access network optimization is satisfied based on the second polymorphic algorithm;
    suspending, by the device, the second polymorphic algorithm in the second tier, when determining that the first type of radio access network optimization did not occur at one or more second locations of the multi-tier network; and
    instantiating, by the device, a third polymorphic algorithm of the first type of radio access network optimization in a third tier of the multi-tier network, wherein the third polymorphic algorithm is configured to optimize based on a third time granularity that is different from the first time granularity and the second time granularity.

5. The method of claim 4, wherein the first polymorphic algorithm, the second polymorphic algorithm, and the third polymorphic algorithm include a common goal function.

6. The method of claim 4, wherein the third tier of the multi-tier network includes at least one of an Open-Radio Access Network-evolved Node B (O-eNB), an Open-Radio Access Network Distributed Unit (O-DU), or an Open-Radio Access Network Radio Unit (O-RU).

7. The method of claim 4, wherein one or more radio access devices of the third tier of the multi-tier network optimizes three-dimensional Multiple Input Multiple Output (3D MIMO) based on the third polymorphic algorithm that pertains to beam management and radio resource scheduling and a Radio Access Network Intelligent Controller (RIC) of the third tier.

8. The method of claim 1, further comprising:
    receiving, by the device, output data from the first polymorphic algorithm pertaining to the first type of radio access network optimization; and
    analyzing, by the device, the output data based on at least one of machine learning or artificial intelligence.

9. The method of claim 1, further comprising:
    selecting, by the device, the first polymorphic algorithm of the first type based on an ordered sequence of radio access network optimization types to be performed that relate to mobility, coverage, quality, capacity, and energy usage, wherein the one or more first locations of the multi-tier network include one or more clusters of cell sites or a cell site of the multi-tier network.

10. A device of a multi-tier network comprising:
    a communication interface, and
    a processor, wherein the processor is configured to:
        instantiate a first polymorphic algorithm of a first type of radio access network optimization in a first tier of the multi-tier network, wherein the first polymorphic algorithm is configured to optimize based on a first time granularity;
        determine whether the first type of radio access network optimization is satisfied based on the first polymorphic algorithm;
        suspend the first polymorphic algorithm in the first tier, when determining that the first type of radio access network optimization did not occur at one or more first locations of the multi-tier network; and
        instantiate a second polymorphic algorithm of the first type of radio access network optimization in a second tier of the multi-tier network, wherein the second polymorphic algorithm is configured to optimize based on a second time granularity that is different from the first time granularity.

11. The device of claim 10, wherein the first type of radio access network optimization relates to mobility, coverage, quality, or capacity.

12. The device of claim 10, wherein the first polymorphic algorithm and the second polymorphic algorithm include a common goal function.

13. The device of claim 10, wherein the processor is further configured to:
    determine whether the first type of radio access network optimization is satisfied based on the second polymorphic algorithm;
    suspend the second polymorphic algorithm in the second tier, when determining that the first type of radio access network optimization did not occur at one or more second locations of the multi-tier network; and
    instantiate a third polymorphic algorithm of the first type of radio access network optimization in a third tier of the multi-tier network, wherein the third polymorphic algorithm is configured to optimize based on a third time granularity that is different from the first time granularity and the second time granularity.

14. The device of claim 13, wherein the first polymorphic algorithm, the second polymorphic algorithm, and the third polymorphic algorithm include a common goal function.

15. The device of claim 13, wherein the third tier of the multi-tier network includes at least one of an Open-Radio Access Network-evolved Node B (O-eNB), an Open-Radio Access Network Distributed Unit (O-DU), or an Open-Radio Access Network Radio Unit (O-RU).

16. The device of claim 10, wherein the processor is further configured to:
   receive, via the communication interface, output data from the first polymorphic algorithm pertaining to the first type of radio access network optimization; and
   analyze the output data based on at least one of machine learning or artificial intelligence.

17. The device of claim 10, wherein the processor is further configured to:
   select the first polymorphic algorithm of the first type based on an ordered sequence of radio access network optimization types to be performed that relate to mobility, coverage, quality, capacity, and energy usage.

18. A non-transitory computer-readable storage medium storing instructions executable by a processor of a device of a multi-tier network, which when executed cause the device to:
   instantiate a first polymorphic algorithm of a first type of radio access network optimization in a first tier of the multi-tier network, wherein the first polymorphic algorithm is configured to optimize based on a first time granularity;
   determine whether the first type of radio access network optimization is satisfied based on the first polymorphic algorithm;
   suspend the first polymorphic algorithm in the first tier, when determining that the first type of radio access network optimization did not occur at one or more first locations of the multi-tier network; and
   instantiate a second polymorphic algorithm of the first type of radio access network optimization in a second tier of the multi-tier network, wherein the second polymorphic algorithm is configured to optimize based on a second time granularity that is different from the first time granularity.

19. The non-transitory computer-readable storage medium of claim 18, wherein the first type of radio access network optimization relates to mobility, coverage, quality, or capacity.

20. The non-transitory computer-readable storage medium of claim 18, wherein the first polymorphic algorithm and the second polymorphic algorithm include a common goal function.

* * * * *